(12) United States Patent
Fourny et al.

(10) Patent No.: US 9,928,288 B2
(45) Date of Patent: *Mar. 27, 2018

(54) AUTOMATIC MODELING OF COLUMN AND PIVOT TABLE LAYOUT TABULAR DATA

(71) Applicant: International Business Machines Corporation, Armonk, NY (US)

(72) Inventors: Joseph P. Fourny, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/736,308

(22) Filed: Jun. 11, 2015

(65) Prior Publication Data

US 2016/0154779 A1 Jun. 2, 2016

Related U.S. Application Data

(63) Continuation of application No. 14/558,146, filed on Dec. 2, 2014.

(51) Int. Cl.
*G06F 17/30* (2006.01)
*G06F 17/24* (2006.01)

(52) U.S. Cl.
CPC ...... *G06F 17/30592* (2013.01); *G06F 17/246* (2013.01)

(58) Field of Classification Search
CPC . G06F 17/30592; G06F 17/245; G06F 17/246
USPC .................................................. 707/600, 810
See application file for complete search history.

(56) References Cited

U.S. PATENT DOCUMENTS

| 6,626,959 | B1 | 9/2003 | Moise et al. |
| 7,143,339 | B2 | 11/2006 | Weinberg et al. |
| 7,999,809 | B2 | 8/2011 | Beers et al. |
| 8,601,383 | B2 | 12/2013 | Folting et al. |
| 9,110,957 | B2 | 8/2015 | Mital et al. |
| 9,690,448 | B2 | 6/2017 | Satterfield et al. |

(Continued)

OTHER PUBLICATIONS

Suresh L. et al., rePivot—Developing Analysis Services with Column Store Database, 2009, 301-306.*

(Continued)

*Primary Examiner* — Jean B Fleurantin
(74) *Attorney, Agent, or Firm* — L. Jeffrey Kelly (57) ABSTRACT

A system for modeling tabular data containing column and pivot table formats. Tabular data containing categorical and/or metric data is received and the metric data is determined. A group of identified columns are grouped comprising one or more adjacent columns containing similar metric data. Adjacent columns with unique metric types are not grouped. A number of columns (n) and rows (m) are identified. A table is generated comprising two sub-tables. A first sub-table is populated by metric data of ungrouped columns, repeated n times, containing ungrouped column category labels. A second sub-table with two columns, populated with grouped column category labels, repeated m times, and metric data from the grouped columns respectively. Category labels of the second table are determined via semantic analysis. The generated table, containing (n×m)+1 rows, is communicated to a model library.

8 Claims, 4 Drawing Sheets

(56) References Cited

U.S. PATENT DOCUMENTS

| | | | |
|---|---|---|---|
| 2007/0067711 A1 | 3/2007 | Woodall et al. | |
| 2009/0300040 A1* | 12/2009 | Kaijima et al. | 707/101 |
| 2010/0205521 A1* | 8/2010 | Folting | 715/227 |
| 2013/0067310 A1* | 3/2013 | Folting | 715/227 |
| 2013/0124957 A1 | 5/2013 | Oppenheimer et al. | |
| 2014/0019842 A1* | 1/2014 | Montagna et al. | 715/227 |

OTHER PUBLICATIONS

IBM: List of IBM Patents or Patent Applications Treated as Related (Appendix P), Jun. 11, 2015, pp. 1-2.

U.S. Appl. No. 14/558,146, filed Dec. 2, 2014 entitled: "Automatic Modeling of Column and Pivot Table Layout Tabular Data", pp. 1-30.

Pending U.S. Appl. No. 14/558,146, filed Dec. 2, 2014, entitled: "Automatic Modeling of Column and Pivot Table Layout Tabular Data", pp. 1-30.

\* cited by examiner

AUTOMATIC MODELING OF COLUMN AND PIVOT TABLE LAYOUT TABULAR DATA

BACKGROUND

The present invention relates generally to the field of databases, and more particularly to tabular data applications and tabular data.

Ad-hoc analytic tools can operate in spreadsheets in order to, for example, return received query results. Reports with tabular data use ad-hoc analysis as all the data may not be relevant to each query and the data modeling may have been required. Manual data modeling may be more time consuming and expensive than automatic modeling tools. Modeling tools may contain predetermined assumptions about the data being modelled. Predetermined assumptions may be necessary for current applications to function but can lead to incorrect or incomplete query results.

A common assumption in modeling tools is the format of the layout of the received tabular data. Two common layouts are columnar or pivot table. In a columnar format, the first row of data provides the names of each column, and each subsequent row provides the values for a given record of data in each column. In a pivot table format the first row(s) and column(s) describe unique members (unique contexts), and each of the other cells provide the value at the intersections of these contexts.

It is possible that an application may receive tabular data containing a mix of columnar and pivot table format data. Importing mixed format tabular data into an ad-hoc tool may result in the entire dataset being interpreted as a single format, for example columnar. This assumption may lead to the tool creating unique hierarchies for each of a set of members, or columns, despite one or more columns containing conceptually similar data in the same hierarchy. This creates a very large model with limited usability.

SUMMARY

Embodiments of the present invention disclose a method, computer program product, and system for modeling tabular data that may contain a mix of column and pivot table format data. Tabular data is received, containing a set of columns and rows. Received columns contain categorical data and/or metric data. The type of the received metric data is determined. A group of columns are identified, the group comprising one or more adjacent columns containing similar metric data. The criteria for similarity is predetermined, for example, metric data within the same order of magnitude are similar. A group of columns with similar metric types is determined to be pivot table formatted data within the received tabular data, and is grouped. Columns with unique metric types when compared to adjacent columns are not grouped or considered ungrouped columns. A number of columns (n) and a number or rows (m) are identified wherein n is a count of columns in the largest group of columns and m is a count of rows of metric data in a largest column within the identified ungrouped columns. A table is generated, containing two sub-tables. The first sub-table table is generated in columnar format, containing (n×m)+1 rows. The first sub-table is populated by the metric data of the ungrouped columns, repeated n times, and the category labels from the ungrouped columns. A second sub-table is generated comprising the tabular data of the grouped columns, containing (n×m)+1 rows and two columns. The first column of the second sub-table is populated with category labels of the grouped columns repeated m times and the second column is populated with metric data from the grouped columns. The category labels of the columns in the second sub-table are determined via semantic analysis where first and second semantic category labels from one or more columns in the grouped columns based on corresponding category labels and metric data respectively. The generated table is communicated to an Online Analytical Processing (OLAP) model library.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An approach to normalizing the two formats of data in a table may include employing a data modeler. A manually created model created by a data modeler may be time consuming and costly. An embodiment of the present invention provides an automatic modeling approach that may allow for a more flexible analysis of data by implementing an embodiment of the invention in order to identifying similar categories in tabular data that may be in a pivot table format and manipulating the data to conform to columnar format. Having a single format allows for more useful and dynamic database queries.

Figure 1:
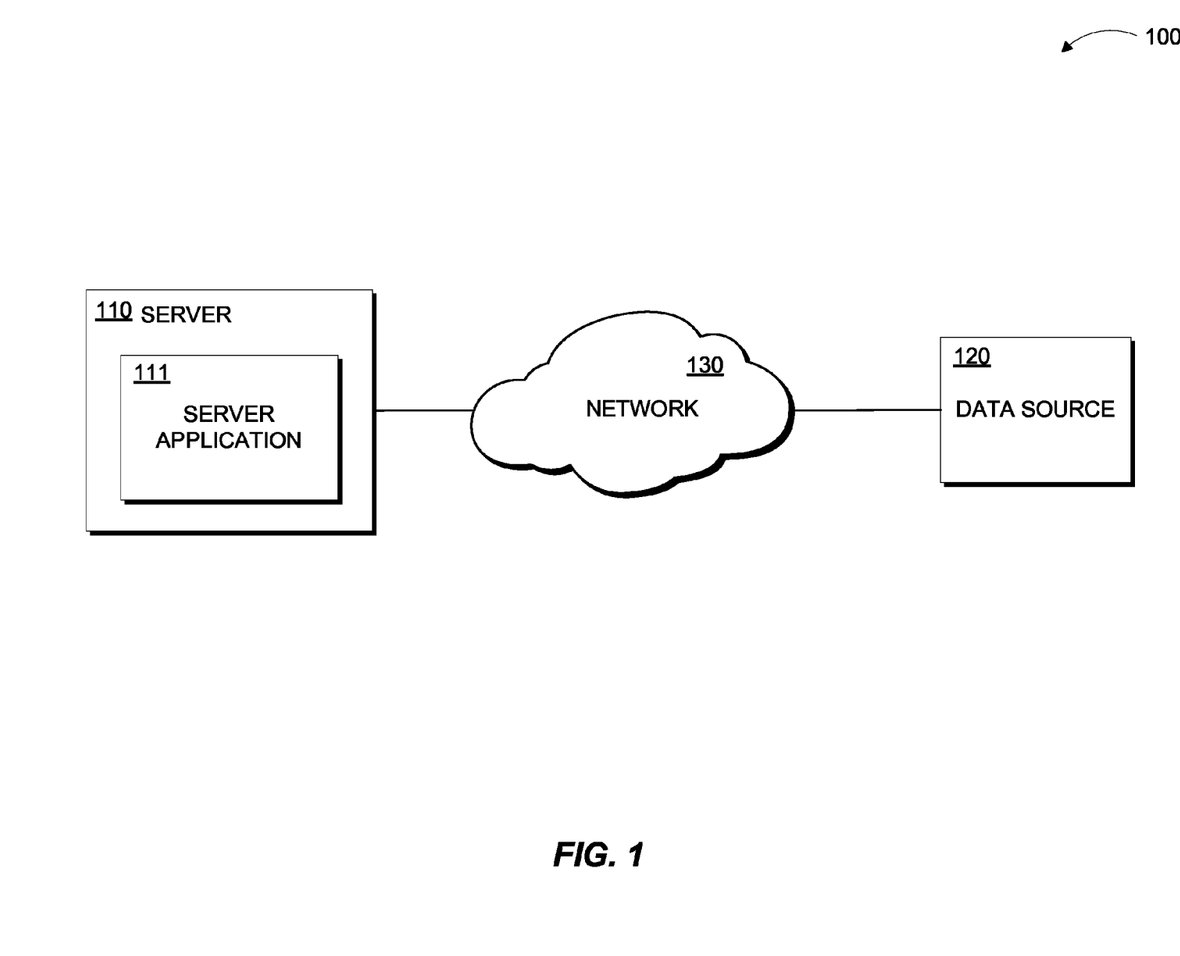
FIG. 1 is a functional block diagram illustrating a distributed data processing environment, in accordance with an embodiment of the present invention.

FIG. 1 is a functional block diagram illustrating a distributed data processing environment generally designated 100, in accordance with one embodiment of the present invention. Data processing environment 100 includes server 110 and data source 120, interconnected over network 130.

Network 130 may include permanent connections, such as wire or fiber optic cables, or temporary connections made through telephone or wireless communications. Network 130 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 130 may also include a number of different types of networks, such as, for example, an intranet, a local area network (LAN), or a wide area network (WAN).

Each of server 110 and data source 120 may be may be a laptop computer, tablet computer, netbook computer, personal computer (PC), a desktop computer, a smart phone, or any programmable electronic device capable of an exchange of data packets with other electronic devices, for example, through a network adapter, in accordance with an embodiment of the invention, and which may be described generally with respect to FIG. 4 below.

Server 110 includes server application 111 which is described in more detail below, in reference to FIG. 2. In various embodiments of the invention, server 110 operates generally to receive tabular data, analyze received tabular data, manipulate tabular data, and generate a tables to be communicated to a model creation library. Server application 111 may be, for example, database oriented, computation oriented, or a combination of these.

Server application 111 may receive a set of tabular data from a data source, for example, data source 120. The received tabular data may have a format for example, columnar or pivot table layout, containing categorical and/or metric data. Categorical data represent cells containing category labels and metric data is numerical or non-numerical data that can be aggregated. Columnar data is formatted such that the first row in each table contains the categorical data and subsequent rows contain metric data. Tabular data in pivot table format is organized such that the first row and the first column contain categorical data, describing the context and subsequent cells contain the metric data reflecting the values at each categorical intersection. Pivot tables may contain one or more row or column with categorical or descriptive data.

Figure 2:
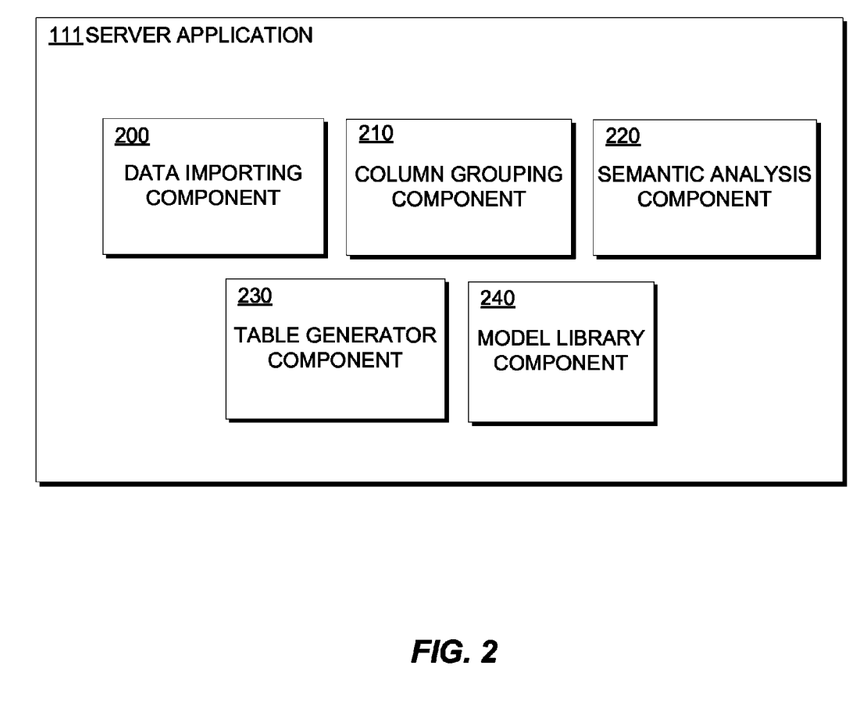
FIG. 2 is a functional block diagram illustrating components of a server of FIG. 1, in accordance with an embodiment of the present invention.

FIG. 2 is a functional block diagram illustrating components of server 110 of FIG. 1, including the components of server application 111 in accordance with an embodiment of the present invention. Server application 111 includes data importing component 200, column grouping component 210, semantic analysis component 220, table generator component 230, and model library component 240.

In an exemplary embodiment of the invention, data importing component 200 may act generally to send and receive data, for example tabular data received from data source 120 via server 110. The tabular data may contain columnar data, pivot table data or a combination of these. The following table (T1) illustrates an example of tabular data containing both columnar and pivot table formatted data that may be received by data importing component 200:

| | | | T1 | | |
|---|---|---|---|---|---|
| Name | Age | Job | Weekly Hours Worked | Weekly Hours Sleeping | Weekly Hours Recreation |
| John | 27 | Architect | 70 | 40 | 15 |
| Jane | 32 | Developer | 54 | 52 | 25 |
| Eric | 47 | Tester | 34 | 47 | 10 |
| Sally | 31 | Developer | 58 | 51 | 14 |
| Bob | 49 | Tester | 51 | 58 | 5 |

Data importing component 200 may pass the imported tabular data to column grouping component 210 or store in a memory store, for example in server 110.

Column grouping component 210 may act generally to analyze metric data from a received table and group similar columns of data together for further analysis. Similar columns may be determined by an analysis of the metric data in each column where predetermined metric data attributed to a type of metric data allow column grouping component 210 to determine similar metric data from dissimilar metric data. Column grouping component 210 may receive imported tabular data from data importing component 200. Column grouping component 210 may analyze each column, in the imported tabular data, in order to determine if any pivot table format data exists. Column grouping component 210 may analyze metric data in each column and may determine that two or more adjacent columns have similar metric data, for example, similar formatting, numerical data within the same magnitude, numerical data within a predetermined rage, or another predetermined metric data characteristic. Column grouping component 210 may analyze each subsequently similar column until a dissimilar column, or the end of the table is reached. Column grouping component 210 may group all the columns from the first similar column to the last similar column, or the end of the table. In various embodiments of the invention, column grouping component 210 may continue to analyze columns after the dissimilar column is reached in order to find another group of similar metric data that may or may not be of the same type as the first grouping. Groups of similar columns may be stored in respective groups associated with the received tabular data table in memory. Column grouping component 210 may pass each group found in the imported tabular data to semantic analysis component 220, pass ungrouped tabular data to table generator component 230 described below, or store grouped and/or ungrouped data in memory.

Referring to the table T1 above, column grouping component 210 may receive a metric characteristic to determine similar metric data in the received tabular data and grouping adjacent columns of similar metric data by type. Column grouping component 210 may have determined the numerical metric data in the adjacent columns "Weekly Hours Worked," "Weekly Hours Sleeping," and Weekly Hours Recreation" as being similar, or, for example, within the same order of magnitude. Analyzing each subsequent column in the table, column grouping component 210 may group columns "Weekly Hours Worked," "Weekly Hours Sleeping," and Weekly Hours Recreation" in a list in memory as "Group A." Ungrouped columns "Name," "Age," and "Job" may be passed to table generator component 230. Group A may be represented by the table below (T2) and may be communicated to semantic analysis component 220:

| T2 | | |
|---|---|---|
| Weekly Hours Worked | Weekly Hours Sleeping | Weekly Hours Recreation |
| 70 | 40 | 15 |
| 54 | 52 | 25 |
| 34 | 47 | 10 |
| 58 | 51 | 14 |
| 51 | 58 | 5 |

Semantic analysis component 220 may act generally as a natural language processor to analyze the categorical data of columns in a received group, identify pivot table tabular data, and generate a category label that semantically encompasses the category labels of all the columns of a received group. Semantic analysis component 220 may be a semantic analysis tools, for example, IBM Smart MetaData®, part of Cognos Insight®. Semantic analysis component 220 may receive a group of similar columns from column grouping component 210. Semantic analysis component 220 may analyze the categories from each column from the received group(s). For example semantic analysis component 220 may analyze the categorical labels from Group A: Weekly Hours Worked; Weekly Hours Sleeping; and Weekly Hours Recreation as encompassed by the category labeled "Weekly Hours," Semantic analysis component 220 may pass the tabular data and the encompassing category label of the received group to table generator component 230 or store in memory. All brand names and/or trademarks used herein are the property of their respective owners.

Table generator component 230 may act generally to receive grouped columns of tabular data, ungrouped columns of tabular data, semantically encompassing categorical labels, generate new tables based on receives columns of tabular data, and merge the generated tables in a single format (columnar) table. Table generator component 230 may receive a group of data, for example Group A, from semantic analysis component 220 that can be represented by the table below (T3):

| T3 | | |
|---|---|---|
| Weekly Hours Worked | Weekly Hours Sleeping | Weekly Hours Recreation |
| 70 | 40 | 15 |
| 54 | 52 | 25 |
| 34 | 47 | 10 |
| 58 | 51 | 14 |
| 51 | 58 | 5 |

Table generator component 230 may receive tabular data that was not grouped by column grouping component 210 and can be represented by the following table (T4):

| T4 | | |
|---|---|---|
| Name | Age | Job |
| John | 27 | Architect |
| Jane | 32 | Developer |
| Eric | 47 | Tester |
| Sally | 31 | Developer |
| Bob | 49 | Tester |

Table generator component 230 may receive the semantically encompassing category label from semantic analysis component 220, for example, Weekly Hours. Table generator component 230 may determine how many columns (n) are in the largest received group. As an example referencing T3 above, table generator component 230 may determine T3 has a n value of 3 as Group A is the largest, or in the present example the only, group received and contains 3 columns. To format the mixed format table into only columnar format, table generator component 230 may generate a first table with (n×m)+1 rows where "m" is the maximum number of rows of metric data in the ungrouped columns. For example, table generator component 230 may receive the ungrouped columns "Name," "Age," and "Job." The maximum number of rows of metric data from the ungrouped columns, or in the present example, only, is 5. Table generator component 230 may generate a table with each metric data cell multiplied by n (e.g. 3) and populate a column with the same categorical label of the received ungroup columns. For example, a table with (n×m)+1 rows populated by the categorical and metric data of received ungrouped columns can be represented in the following table (T5):

| T5 | | |
|---|---|---|
| Name | Age | Job |
| John | 27 | Architect |
| John | 27 | Architect |
| John | 27 | Architect |
| Jane | 32 | Developer |
| Jane | 32 | Developer |
| Jane | 32 | Developer |
| Eric | 47 | Tester |
| Eric | 47 | Tester |
| Eric | 47 | Tester |
| Sally | 31 | Developer |
| Sally | 31 | Developer |
| Sally | 31 | Developer |
| Bob | 49 | Tester |
| Bob | 49 | Tester |
| Bob | 49 | Tester |

Table generator component 230 may generate a second table by performing a un-pivot operation on the grouped data. A un-pivot operation may be performed by copying each row in a column of the grouped columns, for example, Group A, and a first new column is generated where the cells from the first row, containing categorical data, of the grouped columns are added into the first new column and repeated m times, where m, as described above, is the maximum number of rows of metric data in the ungrouped columns. Table generator component 230 may generate a second column that is populated with the metric data from the grouped columns. The metric data from each row of the original grouped column table is entered in to the second new column, where each row of metric data is added to the new second column as n rows. Each row of the generated table contains data, where the first column contains values of the categorical data of the original grouped column table and the second column contains metric data from the original grouped column table, the categorical labels for the first generated column and second generated column may be received from semantic analysis component 220. It may be noted that the table generated via the un-pivot operation also contains (n×m)+1 rows in total. The generated table via the un-pivot operation may be represented, using Group A, by T6 below:

| T6 | |
|---|---|
| Activity | Weekly Hours |
| Work | 70 |
| Sleeping | 40 |
| Recreation | 15 |
| Work | 54 |
| Sleeping | 52 |
| Recreation | 25 |
| Work | 34 |
| Sleeping | 47 |
| Recreation | 10 |
| Work | 58 |
| Sleeping | 51 |
| Recreation | 14 |
| Work | 51 |
| Sleeping | 58 |
| Recreation | 5 |

Table generator component 230 may combine the table generated by the ungrouped columns and the table generated from the grouped columns into a new table. Table generator component 230 may pass the combined generated table to model library component 240 or store in memory for subsequent processing.

For example, table generator component 230 may merge the generated table based on the table generated from ungrouped data, T4 (T5) and the table generated by the un-pivot operation, of grouped columns T3 (T6). The merged table generated by table generator component 230 may be represented by the following table (T7):

| T7 | | | | |
|---|---|---|---|---|
| Name | Age | Job | Activity | Weekly Hours |
| John | 27 | Architect | Work | 70 |
| John | 27 | Architect | Sleeping | 40 |
| John | 27 | Architect | Recreation | 15 |
| Jane | 32 | Developer | Work | 54 |
| Jane | 32 | Developer | Sleeping | 52 |
| Jane | 32 | Developer | Recreation | 25 |
| Eric | 47 | Tester | Work | 34 |
| Eric | 47 | Tester | Sleeping | 47 |
| Eric | 47 | Tester | Recreation | 10 |

-continued

T7

| Name | Age | Job | Activity | Weekly Hours |
|---|---|---|---|---|
| Sally | 31 | Developer | Work | 58 |
| Sally | 31 | Developer | Sleeping | 51 |
| Sally | 31 | Developer | Recreation | 14 |
| Bob | 49 | Tester | Work | 51 |
| Bob | 49 | Tester | Sleeping | 58 |
| Bob | 49 | Tester | Recreation | 5 |

Model library component 240 may act generally as an OLAP library, for example, various products provided by IBM DB2®. Model library component 240 may receive a merged table from table generator component 230. Model library component 240 may store the merged table in memory for later processing.

Figure 3:
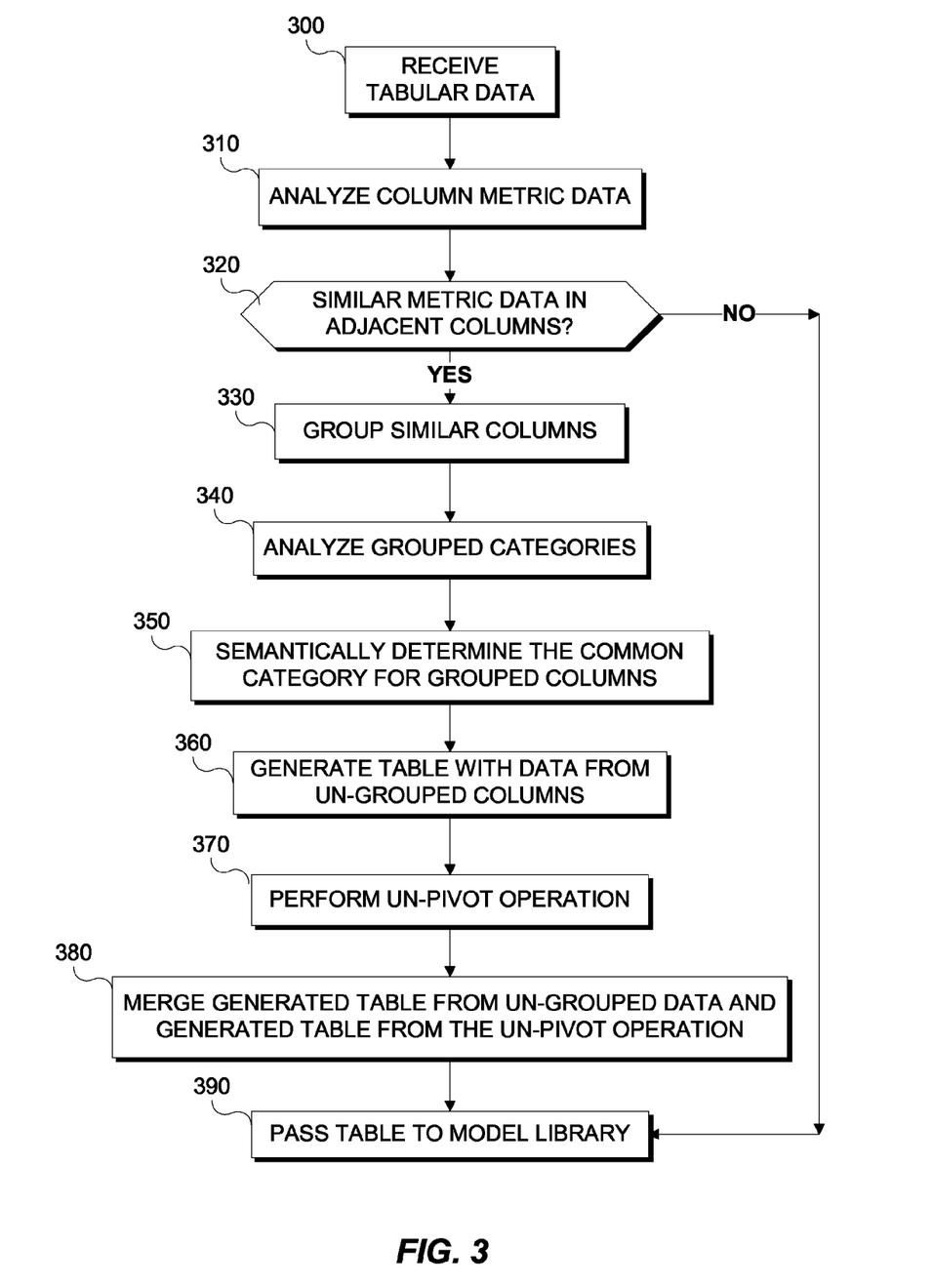
FIG. 3 is a flowchart depicting operational steps of an application receiving and modifying tabular data, in accordance with an embodiment of the present invention.

FIG. 3 is a flowchart depicting the operational steps of an application receiving and modifying tabular data, within the data processing environment of FIG. 1, in accordance with an embodiment of the present invention. Referring to FIGS. 1, 2, and 3, data importing component 200 receives tabular data from a data source, for example, data source 120 (step 300).

Column grouping component 210 receives the tabular data from data importing component 200. Column grouping component 210 analyzes the metric data of each column of the received table (step 310) to determine, as described above, similar columns. If all columns are dissimilar in metric format (decision step 320 "NO" branch) the table is not modified and is passed to model library component 240 (step 390). If two or more adjacent columns are found with similar metric data (decision step 320 "YES" branch), indicating the similar columns are in pivot table format, similar columns are grouped (step 330) by column grouping component 210 and passed to semantic analysis component 220. Column grouping component 210 passes any ungrouped columns to table generator component 230.

Semantic analysis component 220 receives grouped columns from column grouping component 210. Semantic analysis component 220 performs a semantic analysis on the categorical labels of the received grouped columns (step 340) to determine a category label that semantically encompasses all the category labels of the received grouped columns (step 350). Semantic analysis component passes the category label(s) and grouped columns to table generator component 230.

Table generator component 230 receives the ungrouped data from column grouping component 210, grouped columns from semantic analysis component 220, and an encompassing category label(s) from semantic analysis component 220. As described above, table generator component 230 generates a table based on ungrouped data, containing (n×m)+1 rows (step 360). Table generator component 230 generates a table based on the grouped data using a un-pivot operation described above (step 370). The outputs of table generator component 230, the generation of tables from the ungrouped columns and the generation of tables from grouped columns, are merged into a new table, as described above (step 380). The output table of table generator component 230 is passed, by table generator component 230, to model library component 240 (step 390).

Figure 4:
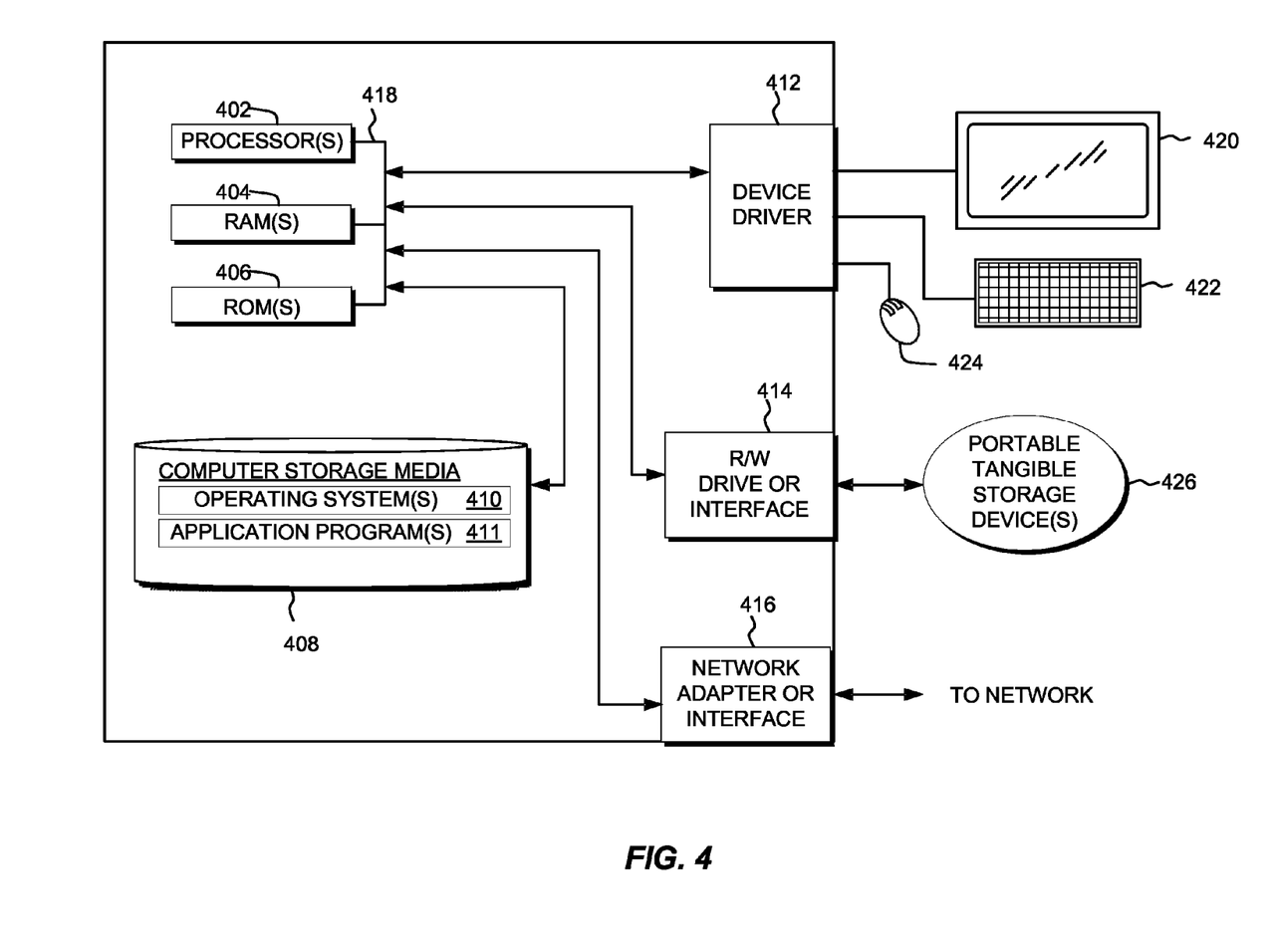
FIG. 4 depicts a block diagram of components of a computing device, in accordance with an embodiment of the present invention.

FIG. 4 depicts a block diagram of components a computer system, for example server 110 and data source 120, of distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110 and data source 120 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, server application 111, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 and data source 120 may also include an R/W drive or interface 414 to read from and write to one or more portable computer readable storage media 426. Application programs 411 on server 110 and data source 120 may be stored on one or more of the portable computer readable storage media 426, read via the respective R/W drive or interface 414 and loaded into the respective computer readable storage media 408.

Sever 110 may also include a network adapter or interface 416, such as a TCP/IP adapter card or wireless communication adapter (such as a 4G wireless communication adapter using OFDMA technology). Application programs 411 on server 110 and data source 120 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110 and data source 120 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer system for modeling tabular data with mixed column and pivot table layout the computer system comprising:
   one or more computer processors;
   one or more computer-readable hardware storage media;
   program instructions stored on the computer-readable hardware storage media for execution by at least one of the one or more processors, the program instructions comprising:
   program instructions to receive tabular data containing a set of columns and rows, from a data source, wherein columns in the set of columns contain a category label and metric data;
   program instructions to determine, for one or more columns in the set of columns, a corresponding metric type;
   program instructions to identify grouped and ungrouped columns in the set of columns, wherein grouped columns comprise one or more pivot type columns, wherein a pivot type column corresponds to a column sharing a predetermined metric type with an adjacent column, and wherein ungrouped columns comprise one or more columnar format columns, wherein a columnar format column corresponds to a column having unique metric types compared to adjacent columns;
   program instructions to generate a table comprising a first sub-table and a second sub-table, wherein the first sub-table further comprises the tabular data of the ungrouped columns and the second sub-table further comprises comprising the tabular data of the grouped columns, and
   program instructions to identify n columns, wherein n is a count of columns in a largest group of columns in the identified group of columns;
   program instructions to identify m rows, wherein m is a count of rows of metric data in a largest column within the identified ungrouped columns; and
   program instructions to generate the first sub-table comprising (n×m)+1 rows, the (n×m)+1 rows, wherein the first sub-table is populated with the category labels and the metric data of the ungrouped columns, and wherein the metric data of the ungrouped columns is repeated n times.

2. The system in accordance with claim 1, wherein program instructions to generate the second sub-table further comprises:
   program instructions to determine first and second semantic category labels for one or more columns in the grouped columns based on corresponding category labels and metric data; and
   program instructions to generate the second sub-table comprising two columns and (n×m)+1 rows, wherein a category label of the first column is populated with the first semantic category label, a category label of the second column is populated with the second semantic category label, rows of the first column are populated with category labels of the grouped columns repeated m times, and rows of the second column are populated with metric data from the grouped columns.

3. The system in accordance with claim 1, wherein the generated table comprises (n×m)+1 rows.

4. The system in accordance with claim 1, further comprising:
   program instructions to communicate the generated third table to an Online Analytical Processing (OLAP) model library.

5. A computer program product for modeling tabular data with mixed column and pivot table layout the computer program product comprising:
   one or more computer-readable hardware storage media and program instructions stored on the one or more computer-readable hardware storage media, the program instructions comprising:
   program instructions to receive tabular data containing a set of columns and rows, from a data source, wherein columns in the set of columns contain a category label and metric data;
   program instructions to determine, for one or more columns in the set of columns, a corresponding metric type;
   program instructions to identify grouped and ungrouped columns in the set of columns, wherein grouped columns comprise one or more pivot type columns, wherein a pivot type column corresponds to a column sharing a predetermined metric type with an adjacent column, and wherein ungrouped columns comprise one or more columnar format columns, wherein a columnar format column corresponds to a column having unique metric types compared to adjacent columns;
   program instructions to generate a table comprising a first sub-table and a second sub-table, wherein the first sub-table comprises the tabular data of the ungrouped columns and the second sub-table comprises the tabular data of the grouped columns, and
   program instructions to identify n columns, wherein n is a count of columns in a largest group of columns in the identified group of columns;
   program instructions to identify m rows, wherein m is a count of rows of metric data in a largest column within the identified ungrouped columns; and
   program instructions to generate the first sub-table comprising (n×m)+1 rows, the (n×m)+1 rows, wherein the first sub-table is populated with the category labels and the metric data of the ungrouped columns, and wherein the metric data of the ungrouped columns is repeated n times.

6. The computer program product in accordance with claim 5, wherein program instructions to generate the second sub-table further comprises:
   program instructions to determine first and second semantic category labels for one or more columns in the grouped columns based on corresponding category labels and metric data; and
   program instructions to generate the second sub-table comprising two columns and (n×m)+1 rows, wherein a category label of the first column is populated with the first semantic category label, a category label of the second column is populated with the second semantic category label, rows of the first column are populated with category labels of the grouped columns repeated m times, and rows of the second column are populated with metric data from the grouped columns.

7. The computer program product in accordance with claim 5, wherein the generated table comprises (n×m)+1 rows.

8. The computer program product in accordance with claim 5, further comprising:
   program instructions to communicate the generated third table to an Online Analytical Processing (OLAP) model library.

\* \* \* \* \*